March 4, 1958  E. E. SCHAEFER  2,825,113
HOSE CLAMP
Filed Feb. 7, 1955  3 Sheets-Sheet 1
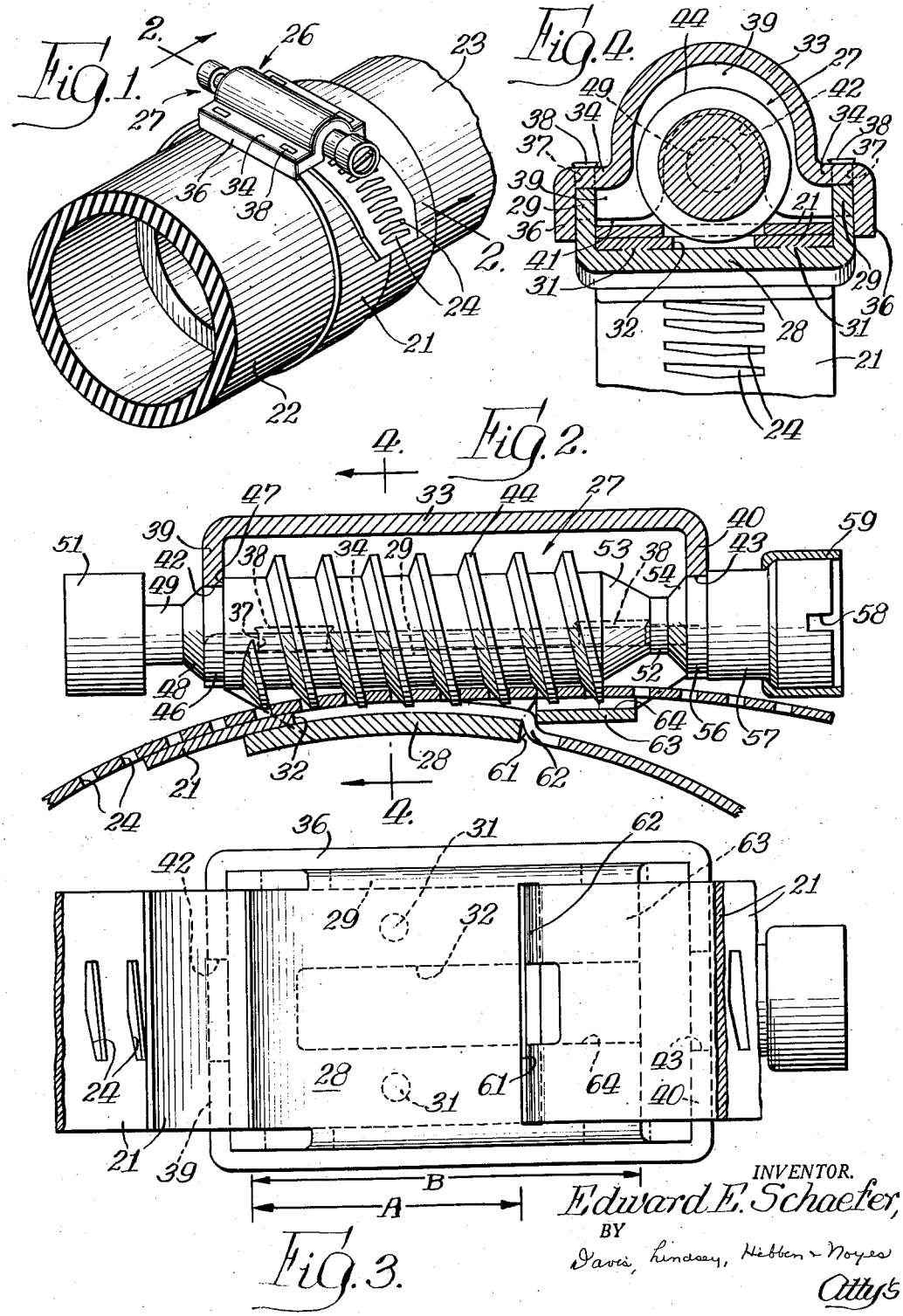
INVENTOR.
Edward E. Schaefer,
BY
Davis, Lindsey, Hibben & Noyes
Atty's

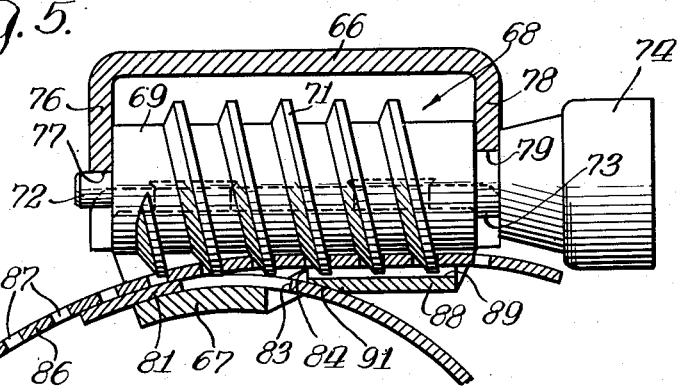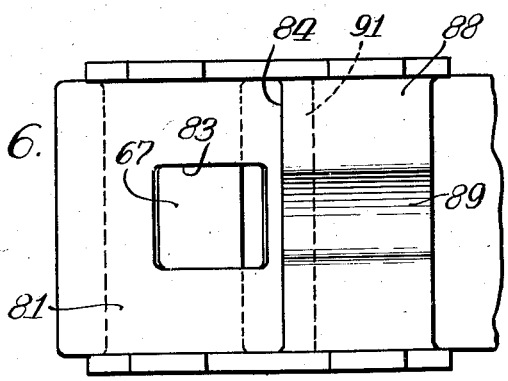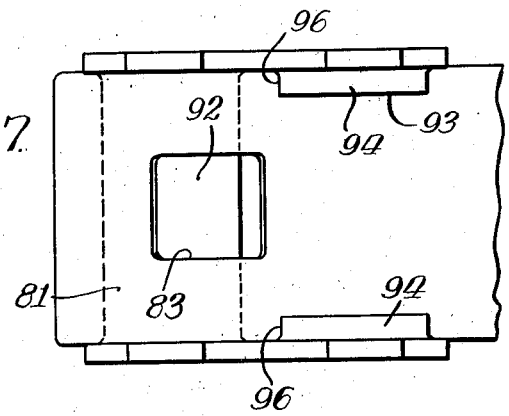

March 4, 1958
E. E. SCHAEFER
2,825,113
HOSE CLAMP
Filed Feb. 7, 1955
3 Sheets-Sheet 3
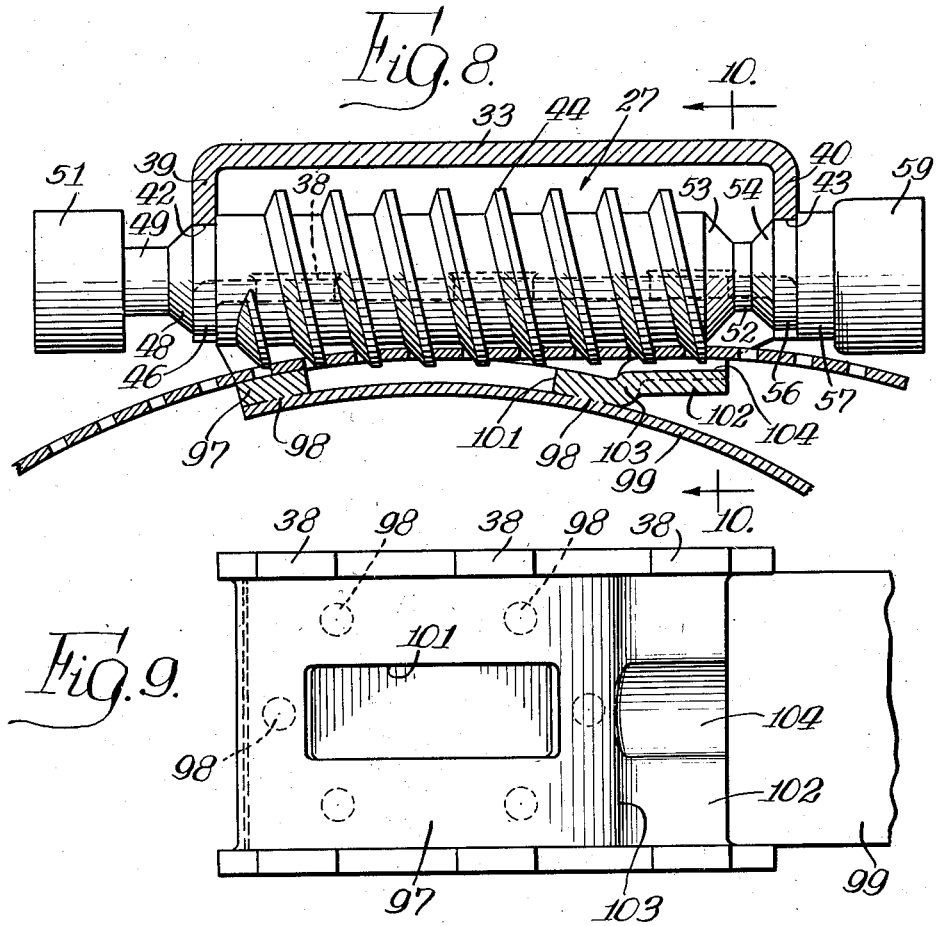
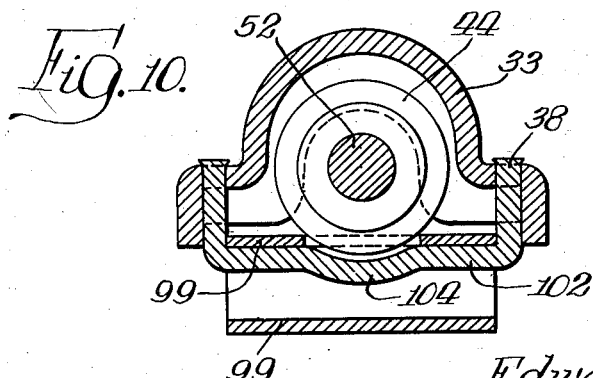
INVENTOR.
Edward E. Schaefer,
BY
Davis, Lindsey, Hibben & Noyes
Atty's

United States Patent Office 2,825,113
Patented Mar. 4, 1958

2,825,113

HOSE CLAMP

Edward E. Schaefer, River Forest, Ill.

Application February 7, 1955, Serial No. 486,389

10 Claims. (Cl. 24—274)

This invention relates to improvements in hose clamps of the type used in connecting a hose to tubes or conduits such as in aircraft or the like.

Generally speaking, the hose clamps of the type to which my invention pertains include an elongated metal band adapted to encircle the hose and having a series of slots or the like at one end and a screw support or housing fastened at the opposite end of the band. A tightening screw or worm is rotatably mounted in the housing, and the clamp is attached by extending the slotted end of the band through the housing so that the screw thread can engage the slotted areas of the band. As the screw is tightened, the free end of the band is drawn through the housing until the band is snugly clamped around the hose for sealing the same to a pipe or other fitting extending into the hose.

In a hose clamp of the above-mentioned type it is frequently desirable that the clamp be secured to the hose with extreme tightness, i. e. with a high tension in the band or high torque as applied to the tightening screw or worm. In most instances, the maximum tension in the clamp is limited by failure of the slotted areas of the band which are engaged by the thread of the tightening screw or worm. In the case of some clamp designs, there may also be failure of the clamp at the point of attachment of the worm housing or support to the slotted end of the band.

By means of a novel structural feature hereinafter described, I have found that it is possible to obtain a very substantial and advantageous improvement in the strength of this type of clamp primarily by increasing the area of contact between the worm thread and the edges of the band slots so as to increase the resistance of the band to tensioning forces in the region of most probable failure. Moreover, in at least one embodiment the invention also affords increased strength and reinforcement at the point of attachment of the band to the worm housing.

Accordingly, a primary object of the invention is to provide a novel and improved hose clamp of the screw thread or worm type which is capable of being tightened to a much greater degree of band tension or worm torque than was heretofore possible in a clamp of this type.

A further object of the invention is to provide a novel and greatly improved hose clamp which is especially adapted for high torque applications.

Another object of the invention is to provide a novel hose clamp of the worm type having improved means for securing the worm housing to the band of the clamp.

An additional object of the invention is to provide, in a hose clamp of the type described, novel means for obtaining increased contact area between the worm and the coacting teeth or slot edges in the band.

Still another object of the invention is to provide a novel and improved hose clamp of the character described which can be used even on small diameter hose without undesirable reduction in the maximum torque limit of the clamp.

Other objects and advantages of the invention will become apparent from the subsequent detailed description taken in conjunction with the accompanying drawings, wherein:

Fig. 1 is a perspective view showing a clamp comprising one specific embodiment of the invention in position on a hose;

Fig. 2 is an enlarged longitudinal sectional view through the tightening mechanism of the clamp as taken substantially along the line 2—2 of Fig. 2;

Fig. 3 is a bottom plan view of the clamp shown in Fig. 2;

Fig. 4 is a transverse sectional view taken along the line 4—4 of Fig. 2;

Fig. 5 is a view similar to Fig. 2 but showing a modification of the invention;

Fig. 6 is a top plan view of the clamp shown in Fig. 5 with the tightening worm and the upper portion of the worm housing removed therefrom;

Fig. 7 is a view similar to Fig. 6 but showing a further modification of the structure;

Fig. 8 is a view similar to Fig. 2 but showing a different embodiment of the invention;

Fig. 9 is a top plan view of the clamp shown in Fig. 8 with the worm and the upper portion of the worm housing removed therefrom; and Fig. 10 is a transverse sectional view taken along the line 10—10 of Fig. 8.

Referring first to Figs. 1 to 4 of the drawings, one specific embodiment of the invention comprises an elongated flat band 21 which encircles a hose 22 for snugly clamping the latter to a tube or pipe 23 projecting into the hose. One end portion of the band 21 is provided with a series of longitudinally-spaced transversely-extending openings which in this case are in the form of slots or apertures 24 extending completely through the thickness of the band. However, as is well understood in this art, the principles of the invention are equally applicable in the case of a band having transverse serrations or corrugations adapted to coact with a screw thread but which do not extend completely through the band thickness, and it is to be understood that the term "spaced apart openings" as herein employed covers both such structures. The opposite end of the band 21 has rigidly secured thereto a tightening mechanism, indicated generally at 26, which includes an elongated rotatable screw or worm 27 having a spiral thread adapted to extend into and coact with the slots 24 for effecting tightening of the band. The slots 24 are disposed at a slight incline to accommodate the spiral thread.

The tightening mechanism 26 also comprises a support or housing for the screw 27 which may conveniently have a two-part construction. The base or saddle portion of the housing is a generally U-shaped member having a bottom 28 underlying the band 21 and upstanding side walls 29. In this instance, the saddle is secured to the band 21 by spot welding, as at 31 (Figs. 3 and 4), on opposite sides of an elongated slot 32 in the end portion of the band 21. The upper portion of the screw housing comprises a cover having a longitudinally extending semi-cylindrical portion 33 with horizontally extending sides 34 and depending terminal flanges 36. The horizontal sides 34 have a plurality of openings 37 into which extend a plurality of prongs 38 projecting upwardly from the saddle side walls 29. The upper ends of the prongs 38 projecting through the openings 37 are peened or riveted over for securely and rigidly interconnecting the cover portion and the saddle portion of the housing.

The upper portion or cover of the screw housing also has a pair of end walls 39 and 40 which are spaced slightly, as at 41 (Fig. 4), from the portion of the band 21 overlying the saddle base 28 so as to accommodate the slotted end portion of the band 21 which extends through the housing in overlapping relation. These end walls 39 and 40 are formed with U-shaped slots 42 and 43, respectively. The elongated tightening screw or worm 27 is rotatably disposed within the housing, and the central body portion of the worm has a continuous spiral thread 44 adapted to protrude into the slots 24 of the band 21. As is customary, the work or back faces of the screw thread 44 are flat so as to provide effective surface engagement with the edges of the slots 24. During tightening of the screw 27, the flat working faces of the screw thread 44 engage the straight edges of the slots 24 for projecting the slotted end portion of the band 21 and holding the same under tension.

Although not an essential feature of the present invention, the construction of the worm 27 is preferably in accordance with the axial shiftability principle described in my copending application Serial No. 406,940, filed January 29, 1954, now U. S. Patent Number 2,767,455, issued October 23, 1956, whereby rapid tightening and release of the clamp is greatly facilitated. Thus, the left-hand end of the screw 27 as viewed in Fig. 2 has a reduced cylindrical portion 46 which seats in journaled relation in the slot 42 of the screw housing when the clamp is in tightened position. The reduction in diameter of the screw at the portion 46 affords a shoulder 47 which seats against the end wall 39 when the clamp is tightened. Beyond the reduced portion 46 the screw is tapered, as at 48, to a cylindrical portion 49 which is of still smaller diameter. An enlarged finger piece 51 is provided at the extreme end of the screw. At the opposite end of the body of the screw a reduced neck portion 52 is provided between oppositely tapered portions 53 and 54. Beyond the tapered portion 54, the screw is again enlarged to a cylindrical bearing portion 56 which is journaled in the slot 43 in the end wall 40 of the housing. The outer right-hand extremity of the worm has a further enlarged head portion 57 which provides a shoulder seating against the end wall 40 when the clamp is tightened. The enlarged head portion 57 is provided with a slot or kerf 58 for receiving a screwdriver and a guide sleeve 59 for facilitating operating engagement of the screwdriver with the slot 58.

As described more fully in my aforementioned copending application, the clamp when in the tightened position shown in Fig. 2 can be speedily released by effecting merely a preliminary loosening of the screw 27 with a screwdriver and thereafter manually shifting the screw axially to the right so as to bring the reduced screw portions 49 and 52 into register with the housing slots 42 and 43, respectively. With the radial clearance thus provided, the screw 27 can then move radially outwardly relative to its housing so as to disengage the spiral thread 44 from the slotted portion of the band and thereby permitting removal of the clamp. In reverse fashion when it is desired to install the clamp, the screw 27 is first manipulated manually to effect preliminary engagement of the thread 44 in the band slots by holding the screw outwardly in its released position and inserting the free slotted end of the band through the screw housing and projecting the same as far as possible by manual pressure. Thereafter, the operator releases the screw 27 thereby allowing the thread 44 to drop into or seat in the slots 24. The tendency of the overlapping band to expand under the resilient pressure of the compressed hose will immediately cause the screw 27 to be shifted axially to the left as viewed in Fig. 2 so that the tapered screw portions 48 and 54 are brought into engagement with the right hand corner edges of the housing slots 42 and 43. As the screw 27 is thereafter tightened with a screwdriver to its final degree of tightness the screw is cammed radially downwardly in the housing as the tapered portions 48 and 54 ride along the corner edges of the slots 42 and 43, and finally the screw reaches the Fig. 2 position wherein the cylindrical bearing portions 46 and 56 are disposed in the slots 42 and 43.

Referring now to Figs. 2 and 3, the primary novel feature of the present invention will be described. As heretofore mentioned, the most frequent point of clamp failure under high tension is in the slotted areas of the band 21. In other words, for any given area of contact between the worm thread 44 and the edges of the slots 24, there is a maximum tension or force which can be resisted and beyond this force the band fails by shearing of the band portions between the slots 24. However, by means of the present invention I am able to increase the total contact area in this region so that the relative tensioning force per unit of contact area is reduced thereby permitting a higher upper tension limit for a clamp of given dimensions and materials of construction.

Heretofore, the effective length of the worm or screw has been limited by the permissible length of the screw housing because of the fact that the housing is mounted on the band and the band must conform substantially to the curvature of the hose even in the region where the worm housing is secured to the band. In other words, the lowermost part of the saddle on the housing must necessarily have a certain degree of curvature in order to conform to the curvature of the hose, and in the clamps heretofore proposed this fact has inherently resulted in only a limited linear portion of the slotted end of the band being sufficiently straight to be engaged by the worm. Since the saddle or floor of the housing had a curvature conforming to the curvature of the band, the free or slotted end of the band assumed substantially the same curvature with a resultant limitation in the number of band slots which could be engaged by the screw threads.

The present invention overcomes the foregoing limitations by means of an improved construction for the worm housing, particularly the lower or saddle portion thereof. Broadly speaking, I provide a worm housing or saddle member having one portion curved to fit around and conform to the curvature of the band for securing the housing thereon and another portion which is substantially straight for holding the free slotted end of the band in increased engagement with the worm thread.

Referring to Figs. 2 and 3, it will be seen that in this embodiment of the invention I provide a relatively long worm housing so as to permit use of a longer worm than usual. However, the saddle base 28 of the worm housing has a transverse slot or opening 61 and the attaching portion of the band 21 which overlies the saddle base 28 extends downwardly through the slot 61 in a laterally offset relation, as by means of a bend 62, so that the band can conform closely to the curvature of the hose in spite of the extended length of the saddle base 28. In other words, insofar as the attaching function of the saddle base 28 is concerned, the effective length of the saddle is from the left-hand end of the saddle to the slot 61, as indicated by the distance "A" in Fig. 3, and the corresponding end of the band can therefore assume the required curvature in the usual manner. It will be noted that this left-hand attaching end of the saddle base 28 is curved to conform to the curvature of the band to which it is welded. However, beyond the slot 61 the saddle base 28 has a substantially straight extension 63 in linear or end-to-end relation with the curved attaching portion of the saddle base and this extension is elevated above the adjacent downwardly curved end of the saddle base so as to hold the outer slotted end of the band 21 in complete engagement with the thread 44 of the longer-than-usual worm 27. Thus, as seen in Fig. 2, the straight extension 63 is substantially tangential to the band curvature and extends outwardly at an acute angle from the curved band so that there is positive engagement of the band slots 24 with more than seven individual turns of the worm thread 44 resulting in a very substantial increase in worm-band contact area at the point of tensioning so that the band can be tightened to much greater tension than usual without failure of the slotted area of the band. Insofar as the free slotted end of the band is concerned, the effective length of the saddle is the full end-to-end distance indicated at "B" in Fig. 3.

By the above-described structural principle, it will be seen that the length of the worm and its housing may be selected to permit the clamp to be tightened to a high degree of torque. The provision of the transverse slot or cut-out area in the base of the worm housing allows the worm-carrying end of the band to conform to the curvature of the hose being clamped while the entire length of the base of the extended housing serves to hold the free slotted end of the band in complete engagement with the thread of the elongated worm thereby counteracting the normal tendency of the free slotted end of the band to curve sharply away from the worm. Of course, the extended end of the housing and the worm project at an acute angle from the band, as seen in Fig. 2, and for any given application the permissible length of the worm and housing may be limited by the necessity of minimizing such angular protrusion. The elongated slot 32 in the band portion overlying the saddle base 28 facilitates full engagement of the worm thread 44 in the band slots 24, and for the same reason I prefer to provide an elongated recess or depression 64 in the end extension 63 of the saddle base 28. It should also be noted that the lateral offset 62 in the band 21 coacts with the edges of the slot 61 to assist in securing the saddle to the band. If the welded connection 31 should fail for any reason, the mechanical interlock at 61—62 would serve to a large extent to hold the worm housing in secured relation on the band.

The embodiment of the invention illustrated in Figs. 1 to 4 has particular utility in connection with relatively large diameter clamps wherein the curvature of the band is not so pronounced. In such circumstances the angular protrusion of the worm housing and the free end of the band from the curved portion of the clamp is not as likely to be objectionable. However, in Figs. 5 and 6 a modification of the invention is shown which may find particular utility in clamps of smaller diameter wherein the curvature of the band is quite sharp.

In Figs. 5 and 6 the worm is the axially non-shiftable type and the cover portion of the housing, designated at 66, is secured in the same manner as before to a saddle having a base portion 67. The worm, designated at 68, has a body or barrel 69 with a spiral thread 71, a reduced diameter end extension 72, an annular groove 73 at the other end, and an enlarged head portion 74. The housing cover 66 has an end wall 76 with a slot 77 in which the extension 72 is journaled. At the opposite end of the housing cover is an end wall 78 with a slot 79 in which the groove 73 is received. The worm-mounting end of the band has an end portion 81 which overlies and is welded to one end portion of the saddle base 67. As seen in Fig. 5, this end of the base 67 is curved to conform closely to the rather sharp curvature of the band 81. As before, the band 81 has a longitudinally extending slot 83 to receive the worm thread 71. The band extends downwardly in this case in its natural smooth curvature through a transverse slot 84 in the saddle base so as to follow closely the curvature of the hose (not shown). At the same time the opposite free end of the band designated at 86 with slots 87 extends through the housing in engagement with the worm. The saddle base 67 has a linear extension 88 beyond the slot 84 which has a recess or groove 89 for accommodating the worm thread 71 and is substantially straight as compared with the left-hand end of the base 67 so as to hold the free slotted end of the band in engagement with the worm thread 71 to a substantially increased extent thereby obtaining the benefits of increased worm-band contact area as heretofore described. Thus, for a smaller size clamp substantially the same advantages are obtained as in the first described embodiment but without the laterally offset bend in the attaching end of the clamp band. As before, the extension 88 is elevated above the left-hand end of the saddle base 67 and in this case the end edge of the extension adjacent the slot 84 is tapered, as at 91, to accommodate the curvature of the band 81.

In Fig. 7 a further modification of the saddle base is shown. Whereas in Figs. 5 and 6 the saddle base 67 has a transverse slot 84 with the band portion 81 extending downwardly therethrough, in Fig. 7 the saddle base, indicated at 92, has its right-hand end portion or extension cut away to a large extent, as at 93, so as to provide merely a pair of narrow laterally-extending flange portions 94 which engage and support the protruding slotted end of the band for holding the same in increased engagement with the worm thread. In other words, the narrow flange portions 94 are sufficient to define a pair of guide slots 96 for the downwardly extending band portion 81 and also to hold the free end of the band against the worm.

In both the Fig. 2 and Fig. 5 embodiments of the invention as herein described, it will be noted that the axial length of the worm is off-center to the right with relation to the left-hand curved attaching portion of the saddle. Heretofore, in clamps of this general character the worm has been substantially centered axially with respect to the curvature of the saddle so that the end turns of the worm thread did not make effective engagement with the band slots. In the present invention, the off-center relation of the worm relative to the curvature of the saddle facilities increased engagement of the thread at one end of the worm, and the above-described effect of the saddle extension insures an increased extent of thread engagement at the opposite end of the worm. As a result, the valuable benefits of increased worm-band contact area are obtained.

In Figs. 8 to 10, I have illustrated another form of the invention which embodies the principles heretofore described but omits the provision of the transverse slot in the saddle base, such as the slot 61 in Fig. 2 and the slot 84 in Fig. 5. As will be evident from Fig. 8, the structure of the tightening worm and the upper part of the housing is exactly the same as in Fig. 2 so that the corresponding parts have been given the same reference numerals, it being unnecessary to repeat the description of these identical structural parts. In this case, the saddle base has a curved portion 97 at one end thereof which is rigidly secured by spot welding 98 to the mounting end of the band 99 and overlies the same. As before, the band 99 has a curvature to conform to the hose (not shown) and the curved end portion 97 of the saddle base conforms closely thereto. A longitudinal slot 101 is again provided in the saddle base portion 97 for accommodating the worm thread 44 projecting through the slotted overlapping end of the band 99. As distinguished from the Fig. 2 and Fig. 5 arrangements, the attaching end of the band 99 in this case is disposed entirely below the saddle base 97 so that there is no necessity for a transverse slot in the saddle base to accommodate the normal hose-conforming curvature of the band. To insure maximum engagement of the band slots with the worm thread, an extension 102 is again provided on the saddle base portion 97 in linear end-to-end relationship therewith. The extension 102 is connected to the end of the curvature portion 97 by means of an upwardly extending bend 103 so that the upper surface of the extension 102 is in general co-planar alignment and substantially tangential relation with the upper surface of the curved saddle base portion 97. As seen in Fig. 8, the terminal slotted end of the band 99 is held upwardly by the extension 102 in engagement with the thread 44 of the tightening worm so that the worm thread is fully engaged with the band slots. The extension 102 also has a longitudinally extending central depression 104 for accommodating the worm thread 44 in the same general fashion as the slot 101.

Although the invention has been described with particular reference to certain specific structural embodiments thereof, it is to be understood that other modifications and alternatives may be resorted to without departing from the scope of the invention as defined in the appended claims.

I claim:

1. A hose clamp comprising a clamping band adapted to surround a hose in clamping relation, said band having at one end portion thereof a plurality of spaced apart openings, a screw support mounted at the other end portion of said band, and a tightening screw rotatably mounted on said support and having a screw thread engageable in said openings when said one end portion of the band is projected in overlapping relation with said other end portion of the band, said support including an elongated base with an attaching portion at one end secured to said other end portion of the band and having a curvature to conform to the band curvature, and a substantially straight extension at the opposite end of said base in end-to-end relation with said attaching portion, said extension being adapted to underlie and support the overlapping end of the band whereby to hold the latter in coacting engagement with said screw thread.

2. A hose clamp comprising a clamping band adapted to surround a hose in clamping relation, said band having at one end portion thereof a plurality of spaced apart openings, a screw support at the other end portion of said band, and a tightening screw rotatably mounted on said support and having a screw thread engageable in said openings when said one end portion of the band is projected in overlapping relation with said other end portion of the band, said support including an elongated one-piece base comprising a longitudinally curved portion secured to and conforming to the curvature of said other end portion of the band, an integral laterally extending bend at one end of said curved portion, and a substantially straight longitudinal extension joined by said bend to said curved portion in end-to-end relation therewith, said extension being adapted to underlie and support the overlapping end of the band whereby to hold the latter in coacting engagement with said screw thread.

3. A hose clamp comprising a clamping band adapted to surround a hose in clamping relation, said band having at one end portion thereof a plurality of spaced apart openings, a screw support mounted at the other end portion of said band, and a tightening screw rotatably mounted on said support and having a screw thread engageable in said openings when said one end portion of the band is projected in overlapping relation with said other end portion of the band, said support including a base extending longitudinally of the band and having a transverse opening intermediate the ends thereof with said other end portion of the band overlying said base over only a portion of the length of the latter and extending transversely through said opening for conforming closely to the curvature of the hose, the overlapping end portion of the band being adapted to extend beyond said opening and thereby overlie said base over the full length of the latter whereby to be held in coacting engagement with said screw thread.

4. In a hose clamp having an elongated band adapted to encircle a hose in clamping relation with a tightening screw and support carried at one end of the band and a slotted portion at the other end of the band adapted to extend into the support in coacting engagement with the screw, the improvement which comprises an elongated base for said support having a transverse opening intermediate the ends thereof with said one end of the band secured to one side of said base and extending transversely through said opening to the other side of said base whereby to permit close conformation of said one end of the band to the curvature of the hose, and said base being adapted to underlie the slotted end of the band for the full length of the base whereby to hold said slotted end in engagement with the screw.

5. The structure of claim 3 further characterized in that said other end portion of the band where it overlies said base is rigidly secured to the base.

6. The structure of claim 3 further characterized in that said other end portion of the band where it overlies said base is rigidly secured to the base, and said band extends through said transverse opening in laterally offset relation for providing a mechanical interlock with said base.

7. The structure of claim 3 further characterized in that said portion of said base at one side of said opening is curved to conform to the curvature of the overlying band and the remainder of said base on the opposite side of said opening is substantially straight and extends at an angle to the band curvature.

8. A hose clamp comprising a clamping band adapted to surround a hose in clamping relation, said band having at one end portion thereof a plurality of spaced apart openings, a housing mounted at the other end portion of said band, and a tightening screw rotatably mounted in said housing and having a screw thread engageable in said openings when said one end portion of the band is projected through said housing in overlapping relation with said other end portion of the band, said housing including a base extending longitudinally of the band and having a transverse slot intermediate the ends thereof with the base at one side of the slot being curved longitudinally to conform to the band curvature and being straight at the other side of the slot, said other end portion of the band overlying the curved end of the base and extending transversely through said slot for conforming closely to the curvature of the hose, and the overlapping end portion of the band thereby being adapted to overlie both the curved and straight ends of said base over the full length of the latter whereby to be held in coacting engagement with said screw thread.

9. The structure of claim 3 further characterized in that one end of said base is curved to conform to the curvature of the overlying band portion and the other end of the base comprises a pair of spaced laterally-extending side flanges adapted to hold the overlapping end of the band in engagement with the screw.

10. A hose clamp comprising a clamping band adapted to surround a hose in clamping relation, said band having at one end portion thereof a plurality of spaced apart openings, a housing mounted at the other end portion of said band, and a tightening screw rotatably mounted in said housing and having a screw thread engageable in said openings when said one end portion of the band is projected through said housing in overlapping relation with said other end portion of the band, said housing including an elongated one-piece base disposed entirely at one side of said band and comprising a longitudinally curved portion at one end secured to and conforming to the curvature of said other end portion of the band, and a substantially straight extension at the other end disposed in end-to-end relation with said curved portion and adapted to underlie and support the overlapping end of the band whereby to hold the latter in engagement with the screw thread.

References Cited in the file of this patent

UNITED STATES PATENTS

| 2,268,211 | Hathorn | Dec. 30, 1941 |
| 2,386,629 | North et al. | Oct. 9, 1945 |

FOREIGN PATENTS

| 336,007 | France | Dec. 28, 1903 |